(12) United States Patent
Doebertin et al.

(10) Patent No.: US 7,142,417 B1
(45) Date of Patent: Nov. 28, 2006

(54) MODULAR COMMUNICATION FIXTURE FOR INSTALLATION ON BOARD OF A PASSENGER CONVEYANCE

(75) Inventors: Oliver Doebertin, Hamburg (DE); Hermann Schotte, Buxtehude (DE); Regine Fischer, Ilshofen (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 10/785,601

(22) Filed: Feb. 23, 2004

(30) Foreign Application Priority Data

Feb. 24, 2003 (DE) ............................... 103 07 958

(51) Int. Cl.
 *G06F 1/16* (2006.01)
(52) U.S. Cl. ............................... 361/683; 312/223.1
(58) Field of Classification Search ........ 361/680–683, 361/724–727; 312/223.1, 223.2, 223.3, 351, 312/351.2; 52/27–37
 See application file for complete search history.

(56) References Cited

U.S. PATENT DOCUMENTS

| | | | | |
|---|---|---|---|---|
| 4,478,467 A | * | 10/1984 | Tyndall | .................... 312/249.9 |
| 4,736,998 A | * | 4/1988 | Wilson et al. | ........... 312/235.3 |
| 4,818,854 A | * | 4/1989 | Davies et al. | ................ 235/381 |
| 5,393,964 A | * | 2/1995 | Hamilton et al. | ........... 235/381 |
| 5,927,835 A | * | 7/1999 | Mergold et al. | ......... 312/235.3 |
| 6,078,848 A | * | 6/2000 | Bernstein et al. | ........... 700/237 |
| 6,475,087 B1 | * | 11/2002 | Cole | ........................... 463/20 |
| 6,487,280 B1 | * | 11/2002 | Akinbi | .................. 379/100.04 |
| 6,646,863 B1 | * | 11/2003 | White et al. | ................. 361/680 |

FOREIGN PATENT DOCUMENTS

EP 0600822 * 6/1994

\* cited by examiner

*Primary Examiner*—Lynn Feild
*Assistant Examiner*—Anthony Q. Edwards
(74) *Attorney, Agent, or Firm*—W. F. Fasse; W. G. Fasse

(57) ABSTRACT

A modular communication fixture is constructed for installation in a passenger conveyance particularly a passenger aircraft cabin. The fixture includes first components for the use and/or benefit of passengers and second components for the use by on board personnel only. The fixture has a housing and a door with an opening. The first components are so arranged in the housing that the first components are available for use by passengers through the opening in the door when the door is closed. The second components are so arranged that personnel can use the respective components when the door is open. When the door is open the fixture provides a work station for a personnel member.

11 Claims, 2 Drawing Sheets

MODULAR COMMUNICATION FIXTURE FOR INSTALLATION ON BOARD OF A PASSENGER CONVEYANCE

PRIORITY CLAIM

This application is based on and claims the priority under 35 U.S.C. §119 of German Patent Application 103 07 958.0 filed on Feb. 24, 2003, the entire disclosure of which is incorporated herein by reference.

FIELD OF THE INVENTION

The invention relates to a modular communication fixture constructed for installation on a passenger conveyance such as an aircraft, a train, or a ship. The fixture includes components for use by passengers and other components for use by a personnel member.

BACKGROUND INFORMATION

Conventional similar fixtures have only the capability of an audio/video control center in an aircraft. The center is constructed for operation by the cabin personnel and does not provide any services for individual passengers. A conventional center is frequently installed in a luggage compartment or in a stowing cabinet where it takes up space that could otherwise be used for luggage and/or clothing. Moreover, a conventional center of this type serves exclusively for the cabin specific controls by personnel, but does not provide any conveniences for the passengers.

Other conventional terminals of this kind that are constructed for the convenience of customers are not installed in a transport conveyance, but rather in buildings, such as banks offering an automatic teller, or in train stations offering automatic ticket vending machines, or in airports offering flight insurance policies and so forth. It is also known to equip, for example a sleeping car on a train with an information center including bar counter elements. A train attendant may temporarily be positioned behind such a counter where the attendant can reach individual sleeping cabins by telephone. Generally, these terminals or information centers have a rather rigid construction which requires a substantial space for installation.

Additionally, conventional fixtures of this kind are quite heavy and therefore not suitable for installation in a passenger aircraft.

OBJECTS OF THE INVENTION

In view of the foregoing it is the aim of the invention to achieve the following objects singly or in combination:

to construct a modular information fixture for installation in an aircraft that will provide information and communication facilities for passengers and control functions to be performed by conveyance personnel, whereby the fixture is capable of performing multi-functions on the conveyance, particularly on board an aircraft;

the fixture shall be of compact and lightweight construction, particularly for use in commercial passenger aircraft, and also take up as little space as possible; and the fixture must have a divided access feature so that certain passenger conveniences are accessible by passengers and personnel while other features, particularly cabin control features, are accessible only by a member of the personnel, but not by a passenger.

SUMMARY OF THE INVENTION

The above objects have been achieved according to the invention by a modular communication fixture constructed for installation on board of a passenger transport conveyance such as a passenger aircraft. The present communication fixture is characterized by a housing, and an information and communication terminal installed in the housing for use by passengers or personnel. The terminal comprises a control and monitoring section installed in the housing for use by personnel and a passenger service section installed in the housing for use by passengers.

The housing is preferably a frame or enclosure provided with multi-function components to form an information terminal. The modular communication fixture is preferably installed in the entrance and exit area of a passenger aircraft to thereby achieve the advantage of using space that heretofore has not been taken up by cabin fixtures. Further, the entrance and exit area of an aircraft will not be noticeably diminished by the compact construction of the present modular unit. Thus, space in an overhead luggage compartment or in a clothing closet is saved. Moreover, incoming passengers can immediately see information on a display screen how to proceed to their seats on a display screen of the modular communication fixture. During flight the modular fixture serves in its opened state as a work station for a cabin attendant for performing several functions such as an information center, a cabin system control center, and a video/audio control center.

In addition to the components primarily intended for use by cabin attendants during flight, the modular communication fixture further comprises service elements for passenger conveniences, such as information regarding connecting flights, a telephone access center, and the possibility of retrieving information from the internet or transmitting information in the form of e-mail through the internet and even making hotel reservations.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF A PREFERRED EXAMPLE EMBODIMENT AND OF THE BEST MODE OF THE INVENTION

A modular fixture in the form of an information or communication terminal according to the invention functions as a central unit for the input and recall of information when the passenger conveyance is in operation. Such a modular fixture serves as a passenger convenience and as a terminal or work station for the control of cabin features, for example adjustable cabin climate values, illumination requirements, public announcements, and so forth. When the information terminal functions as a passenger service convenience it may, for example, provide information relating to connecting flights, to hotel reservations, and it may function as a telephone exchange station, and as a website for sending e-mails and so forth.

Figure 1:
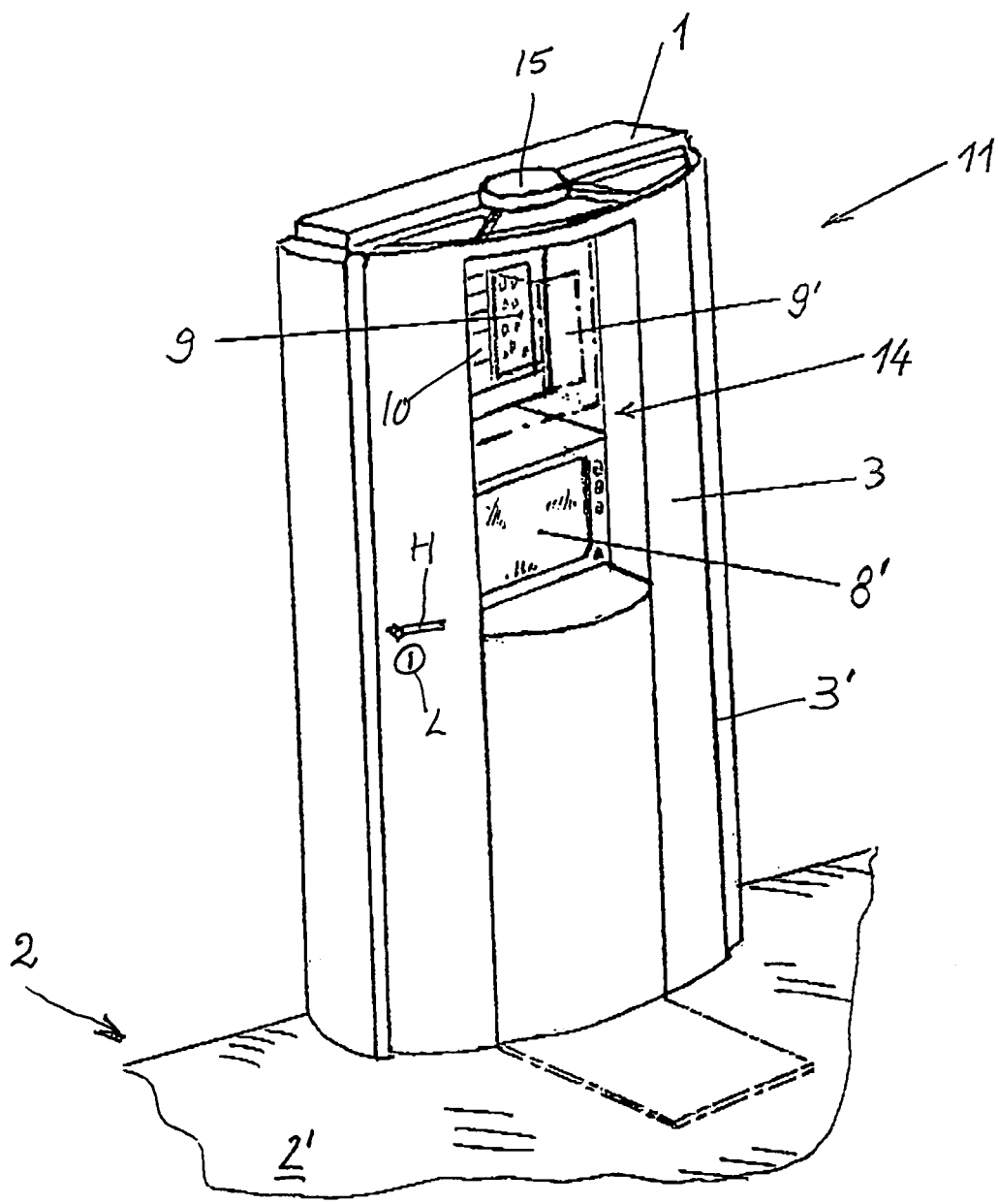
FIG. 1 is a perspective view of the modular communication fixture according to the invention with its door closed.
Figure 2:
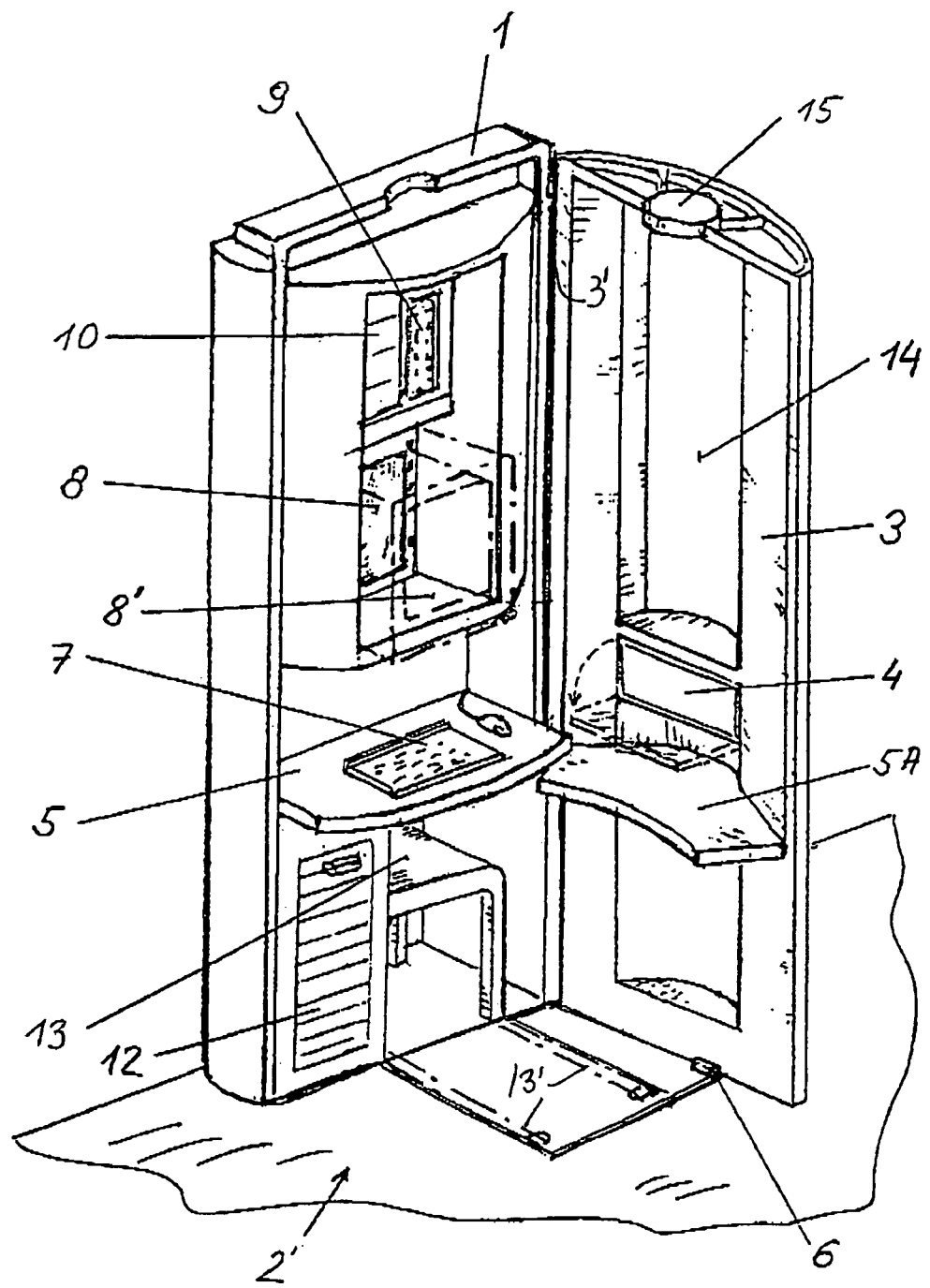
FIG. 2 is a view similar to that of FIG. 1 showing the modular fixture with its door opened.

FIG. 1 shows the present modular communication fixture 11 installed in a cabin entrance and exit area 2 on the floor 2'. The modular fixture 11 comprises a housing, for example in the form of a frame 1 closeable by a door 3 secured to the frame 1 for example by a hinge 3'. The door 3 has a lock L and a handle H. The lock L assures, that passengers will not have access to fixture components which are intended for access only by flight personnel, as will be described in more detail below. The door has an opening 14 that provides access to a touchscreen 9 since the user can reach through the opening 14. The touchscreen 9 can assume two positions, namely a pulled-out forward position 9 and a recessed position 9'. In the forward position of the touchscreen 9 it covers a forward attendant panel (CIDS) 10. Similarly, a display screen 8 such as a television screen can assume a recessed position 8 or a forward position 8'. In the forward position the display screen 8 can be viewed through an opening 14 and the door 3. Similarly, the touchscreen is accessible through the opening 14 when the screen is in the forward position 9'. Passengers entering the entrance and exit area 2 can view the screen in its forward position 8' to obtain directions information how to proceed to their seats. Referring to FIG. 2, the box frame 1 of the modular fixture 11 is dimensioned to be compatible with aircraft cabin dimensions.

For example, the fixture may have the dimension of 650 mm×1400 mm×2100 mm. Such a dimension does not impair the free movement of passengers and crew in the area 2. The door 3 is preferably molded outwardly and carries itself certain components, for example, a flap top 4 that serves as a cup holder or as a minibar feature, a work support 5A and at least one lamp 15. The work support plate 5A is mounted at a level slightly lower than a keyboard support 5 carrying a keyboard 7. Thus, the work support 5A can slide under the keyboard support 5 when the door 3 is closed. Preferably, a hinge 3' permits opening the door by 90°. In its open position the door 3 is locked in place by a lock 6. A stool 13 is positioned in the space below the keyboard support 5 and can be moved out of its storage space, preferably along guide rails 13' when the door 3 is opened. The stool is also lockable in both positions.

The above mentioned display screen such as a television screen 8 and the touch screen 9 are so positioned that they can be seen and used through the opening 14 in the door 3. The forward attendant panel 10 is accessible to a flight attendant only when the door is open. Further components housed in the fixture, but not shown, include for example a computer, DVD drives, a fax machine, a scanner, CD-ROM drives, and other accessory components. A space 12 for storage is provided next to the stool 13. The storage space 12 may, it self have a door, for example a roll-up door. All movable components such as the door 3, the stool 13, the display screen 8, and the touch screen 9 are lockable in their respective end positions, that is in the recessed position as well as in the forward use position. The shiftability of the just mentioned components permits working with the fixture either sitting or standing when the fixture is open, thus providing a work station for an attendant. A passenger can use the fixture only while standing and the door 3 closed. The lamp 15 distributes light downwardly and also inwardly toward the touchscreen 9.

During starting and landing the modular fixture 11 is closed as shown in FIG. 1, whereby the components 8 and 9 are shifted into the forward position 8' and 9' respectively, if desired. In this position a flight attendant may also control the components through the opening 14. Additionally, the components are better visible for entering passengers to see displayed information. The same holds true when passengers leave the aircraft, whereby airline videos or information videos may be shown, for example giving weather information for the arrival port. During flight the fixture 11 is opened and functions as an information center, whereby a cabin attendant may use the stool 13. Thus, it is possible to control the cabin function such as illumination and temperature. Simultaneously, convenience services may be provided for the passengers such as requesting information within the aircraft through a so-called intranet and providing connections to the internet, whereby documents may be printed through a fax machine or informations for connecting flights and hotel reservations may be provided in the form of a hard copy.

Due to the fact that during starting and landing the door 3 is closed, the present modular fixture does not interfere with the boarding and exiting of the passengers. Thus, the entrance and exit area is used more efficiently and cabin storage space is saved while providing, during flight, a work station for a flight attendant or other attendant in a passenger conveyance and convenience services for passengers.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A modular communication fixture for installation on board of a passenger conveyance, comprising a housing, an information terminal and a communication terminal installed in said housing for use by passengers and personnel, said terminals comprising a control and monitoring section installed in said housing for use only by and accessible only to personnel, and a passenger service and personnel section installed in said housing for use and accessible by passengers and personnel, said fixture further comprising a door secured to said housing, and built-in components in said housing, said built-in components including at least one keyboard and an open space below said keyboard, and a work support plate installed in said door in a position for fitting into said open space below said keyboard when said door is closed.

2. The modular communication fixture of claim 1, wherein said housing is a frame structure (1) in which said information terminal and said communication terminal are installed, and wherein said door (3) is operatively secured to said frame structure (1), said door having an opening (14) functioning as a reach through opening in said door (3).

3. The modular communication fixture of claim 1, wherein said housing is constructed as a built-in fixture installed in a fixed position in said passenger conveyance, and wherein said door is a lockable hinged door (3) with a reach through opening (14).

4. The modular communication fixture of claim 1, further comprising in said housing built-in components including a display screen (8), a touchscreen (9), a keyboard (10) and a stool, guide means in said housing for shifting any one of said built-in components between a retracted position and a use-position, and position locks for arresting any one of said built-in components in said retracted position and in said use-position.

5. The modular communication fixture of claim 1, further comprising first built-in components positioned in said housing, a reach through opening in said door, wherein said first built-in components are positioned in said housing to be accessible for use when said door is open and also through said reach through opening in said door when said door is closed and second built-in components so positioned in said housing that access to said second built-in components is prevented when said door is closed and locked.

6. The modular communication fixture of claim 1, wherein said door comprises a reach through opening and wherein said modular communication fixture comprises convenience components installed in said door below said reach through opening (14).

7. The modular communication fixture of claim 6, wherein said convenience components comprise a cup holder or minibar facility, is installed below said reach through opening (14), and said modular communication fixture further comprises at least one lamp above said reach through opening (14).

8. The modular communication fixture of claim 1, wherein said information terminal and communication terminal comprise a computer provided in common for said control and monitoring section and for said passenger service section, said control and monitoring section comprising an audio/video control center and a cabin system control center, said housing further comprising electrical and data terminals for all components installed in said housing for connection to respective power supply lines and to at least one data bus.

9. The modular communication fixture of claim 1, installed in an entrance and exit area of said passenger conveyance, and wherein said door (3) comprises a reach through opening (14), said door being openable into said entrance and exit area.

10. The modular communication fixture of claim 1, wherein said door comprises a reach through opening (14) for permitting passenger access to said passenger service section and for preventing passenger access to said control and monitoring section.

11. The modular communication fixture of claim 1, installed in any one of an aircraft body, a passenger train and a passenger ship.

* * * * *

UNITED STATES PATENT AND TRADEMARK OFFICE
CERTIFICATE OF CORRECTION

PATENT NO. : 7,142,417 B1 Page 1 of 1
APPLICATION NO. : 10/785601
DATED : November 28, 2006
INVENTOR(S) : Doebertin et al.

It is certified that error appears in the above-identified patent and that said Letters Patent is hereby corrected as shown below:

<u>Column 3,</u>
Line 22, after "seats.", there should be a paragraph break and return;
Line 25, after "dimensions", there should be no paragraph break and return;

<u>Column 5,</u>
Line 13, after "facility,", insert --said work support plate (5A)--.

Signed and Sealed this

Twenty-sixth Day of June, 2007

JON W. DUDAS
*Director of the United States Patent and Trademark Office*